US008683596B2

(12) United States Patent
Amit et al.

(10) Patent No.: US 8,683,596 B2
(45) Date of Patent: Mar. 25, 2014

(54) DETECTION OF DOM-BASED CROSS-SITE SCRIPTING VULNERABILITIES

(75) Inventors: Yair Amit, Tel-Aviv (IL); Yinnon A. Haviv, Beerotaim (IL); Daniel Kalman, Herzliya (IL); Omer Tripp, Herzliya (IL); Omri Weisman, Herzliya (IL)

(73) Assignee: International Business Machines Corporation, Armonk, NY (US)

( * ) Notice: Subject to any disclaimer, the term of this patent is extended or adjusted under 35 U.S.C. 154(b) by 56 days.

(21) Appl. No.: 13/283,989

(22) Filed: Oct. 28, 2011

(65) Prior Publication Data

US 2013/0111594 A1    May 2, 2013

(51) Int. Cl.
*G06F 21/00* (2013.01)

(52) U.S. Cl.
USPC ............... 726/25; 726/22; 726/23; 726/24; 713/187; 713/188; 713/192; 713/193; 709/225; 709/226; 709/227; 709/228; 709/229

(58) Field of Classification Search
USPC ............... 726/22–33; 713/150, 187–188; 709/203, 217–219
See application file for complete search history.

(56) References Cited

U.S. PATENT DOCUMENTS

| 7,933,946 | B2 | 4/2011 | Livshits et al. | |
|---|---|---|---|---|
| 2002/0087660 | A1* | 7/2002 | Martin et al. | 709/218 |
| 2004/0202116 | A1* | 10/2004 | Wienold et al. | 370/310 |
| 2008/0120722 | A1 | 5/2008 | Sima et al. | |
| 2009/0282480 | A1* | 11/2009 | Lee et al. | 726/22 |
| 2009/0293102 | A1* | 11/2009 | Klein et al. | 726/2 |
| 2010/0172594 | A1 | 7/2010 | Priddle et al. | |
| 2010/0250706 | A1* | 9/2010 | Burckart et al. | 709/219 |
| 2011/0185271 | A1* | 7/2011 | Aciicmez et al. | 715/234 |
| 2012/0198558 | A1 | 8/2012 | Liu et al. | |

FOREIGN PATENT DOCUMENTS

| EP | 1420562 A2 | 5/2004 |
|---|---|---|
| WO | 2011009295 A1 | 1/2011 |

OTHER PUBLICATIONS

Engelmann, B., "Dynamic Web Application Analysis for Cross Site Scripting Detection," Master's Thesis, University of Hamburg, Sep. 3, 2007, [online] retrieved from the Internet: <https://www.informatik.uni-hamburg.de/SVS/archiv/thesis/07-09-03-DA-Engelmann-Dynamic-Analysis-for-XSS-Detection.pdf>, 88 pgs.

Wang, K., et al., "Anomalous Payload-Based Network Intrusion Detection," [online] in Recent Advance in Intrusion Detection (RAID) Sep. 2004, retrieved from the Internet: <http://hdl.handle.net/10022/AC:P:8695 >, 20 pgs.

Russo, A., et al., "Tracking Information Flow in Dynamic Tree Structures," [online] In Proc. European Symp. on Research in Computer Security (ESORICS), LNCS 5789, pp. 86-103, Sep. 2009, retrieved from the Internet: <http://www.cse.chalmers.se/~andrei/esorics09.pdf> 18 pgs.

(Continued)

*Primary Examiner* — Thanhnga B Truong
*Assistant Examiner* — Josnel Jeudy
(74) *Attorney, Agent, or Firm* — Cuenot, Forsythe & Kim, LLC

(57) ABSTRACT

Testing a Web-based application for security vulnerabilities. At least one client request including a payload having a unique identifier can be communicated to the Web-based application. Response HTML and an associated Document Object Model (DOM) object can be received from the Web-based application. Content corresponding to the payload can be identified in the DOM object via the unique identifier. A section of the DOM object including the payload can be identified as un-trusted.

17 Claims, 3 Drawing Sheets

(56) References Cited

OTHER PUBLICATIONS

Chen, J.M., et al., "An Automated Vulnerability Scanner for Injection Attack Based on Injection Point," Computer Symposium (ICS), Dec. 16-18, 2010, pp. 113-118, retrieved from the Internet: <http://ieeexplore.ieee.org/application/mdl/mdlconfirmation.jsp?arnumber=5685537>.

UK Patent Appln. No. GB1218726.6, Search and Examination Report, Mar. 14, 2013, 8 pg.

\* cited by examiner

US 8,683,596 B2

DETECTION OF DOM-BASED CROSS-SITE SCRIPTING VULNERABILITIES

BACKGROUND

One or more embodiments disclosed within this specification relate detection of Document Object Model (DOM) based cross-site scripting vulnerabilities.

With the advent of Internet based technologies, Web applications are increasingly becoming more sophisticated. As these technologies become more sophisticated, they also become vulnerable to exploits by unscrupulous users who access the Web-based applications (hereinafter "Web applications"). These exploits often are notoriously hard to find, in particular when a user provides a malicious payload to a server of a Web application, for instance in a user request. The Web application may be especially vulnerable if the Web application uses a template for responses, such as an HTML response template, which is instantiated using dynamic values, such as request parameters, provided by a user.

In illustration, during cross-site scripting (XSS) attack, a user request may include a malicious payload that includes HTML markup language which a website's JavaScript™ code does not expect, and this HTML markup can be echoed to the Web application's DOM at runtime. To subsequent clients, the HTML markup echoed into the DOM may be indistinguishable from other parts of the DOM. This HTML markup can change the manner in which the Web application handles subsequent user requests, and thus can alter the manner in which the Web application responds to the user requests. For example, a malicious payload can cause an undesired response to be rendered into a HTML's DOM response provided from the Web application to a client-side application, such as a web browser.

BRIEF SUMMARY

One or more embodiments disclosed within this specification relate to DOM-based cross-site scripting vulnerabilities.

The present specification relates to testing a Web-based application for security vulnerabilities. One embodiment of the present invention can include a system. The system can include a computer-readable storage medium having computer-readable program code embodied therewith, and a processor coupled to the computer-readable storage medium. Responsive to executing the computer-readable program code, the processor can be configured to perform executable operations comprising, communicating at least one client request comprising a payload having a unique identifier to the Web-based application, receiving from the Web-based application response HTML and an associated Document Object Model (DOM) object, identifying content corresponding to the payload in the DOM object via the unique identifier, and identifying a section of the DOM object comprising the payload as un-trusted.

Another embodiment of the present invention can include a computer program product for testing a Web-based application for security vulnerabilities. The computer program product can include a computer-readable storage medium having computer-readable program code embodied therewith. The computer-readable program code can include computer-readable program code configured to communicate at least one client request comprising a payload having a unique identifier to the Web-based application, computer-readable program code configured to receive from the Web-based application response HTML and an associated Document Object Model (DOM) object, computer-readable program code configured to identify content corresponding to the payload in the DOM object via the unique identifier, and computer-readable program code configured to identify a section of the DOM object comprising the payload as un-trusted.

Another embodiment can include a system that includes a computer-readable storage medium having computer-readable program code embodied therewith configured to perform the various operations and/or functions disclosed within this specification.

DETAILED DESCRIPTION

Figure 1:
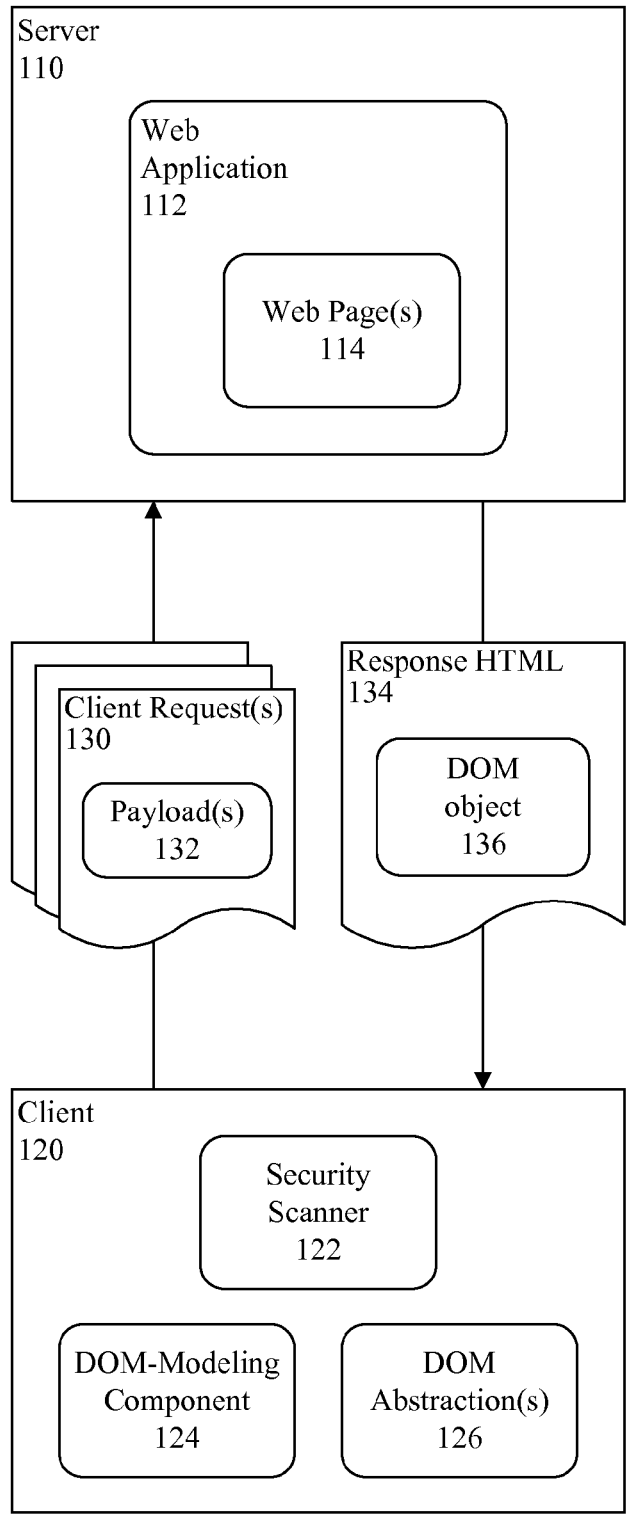
FIG. 1 is a block diagram illustrating a system for detecting DOM-based cross-site scripting vulnerabilities in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The present invention relates to a methodology that enables tracking the history leading to the use of a Document Object Model (DOM) element by JavaScript code, such that DOM-based XSS attacks can be discovered efficiently and accurately. Specifically, a security scanner can send one or more payloads to a Web-based application (hereinafter "Web application") to attempt to identify vulnerabilities in the Web application. As used herein, the term "payload" means script code provided to a web application in a client request.

Each payload can include a unique identifier, which can be reflected in a web page DOM object if the web page was vulnerable to the payload. When the Web application subsequently provides client-side script code, such as JavaScript™ code, to a client, the client-side script code can be executed in an isolated computing environment, known as a "sandbox." If, during the execution of the script code, there is an indication that a payload has been used by the script code in a vulnerable way, then the security scanner can generate an indication that a vulnerability exists in the script code. Accordingly, Web application developers can be appraised to the situation that the vulnerability exists, and modify the Web application to take preventative measures.

FIG. 1 is a block diagram illustrating a the system 300 for detecting DOM-based cross-site scripting vulnerabilities in accordance with one embodiment of the present invention. The system 300 can include a server 110. The server 110 can be a processing system or device suitably configured, for example via execution of an operating system on the server, to host at least at least one Web application 112. The Web application can include one or more web pages 114. The server 110 also can host one or more additional Web applications (not shown). As used herein, the term "Web application" means an application that is accessed over a network such as the Internet or an intranet. As used herein, the term "web page" means is a document or information resource that is available to be accessed via a network, such as the Internet or an Intranet, and can be accessed through a client application, such as a web browser.

The system further can include a client 120. In one embodiment, the client 120 can be a processing system or device communicatively linked to the server 110, for example via one or more communication networks or via one or more input/output (I/O) ports. As such, the client 120 can be configured to execute an operating system and one or more client-side applications. The client side applications can include a security scanner 122 and a DOM-modeling component 124, which will be described herein in greater detail. In another embodiment, the security scanner 122 and the DOM-modeling component 124 can execute on the server 110.

Regardless of where the security scanner 122 and the DOM-modeling component 124 are located, these components can be executed in a sandbox. A sandbox provides a tightly-controlled set of resources for execution of guest programs, such as the security scanner 122 and the DOM-modeling component 124. In illustration, a sandbox can provide scratch space in memory for such execution. In a sandbox, network access, the ability to inspect the host system or read from input devices usually are disallowed or heavily restricted only to operations necessary to perform analysis and/or testing. In this sense, a sandbox is a specific example of virtualization.

To simulate a DOM-based cross-site scripting (XSS) attack against the web page 114, the security scanner 122 can be executed to automatically communicate one or more client requests 130 to the Web application 112. Each client request 130 can include one or more payloads 132. The payloads 132 can include code generated or retrieved by the security scanner 122 to test vulnerabilities that may be present in the Web application 112. For example, a payload 132 can include script, such as JavaScript™ and/or ActionScript™, intended to attempt to echo certain content of the payload 132 into the DOM of the web page 114 at runtime.

When the client request 130 (and hence the payload 132), is processed by the Web application 112, and if the Web application 112 has a vulnerability to the payload 132, the payload may be echoed to the web pages DOM. Each payload 132 can include a unique identifier, which later may be detected to facilitate recognition of a vulnerability in the web page 114. An example of a payload 132 is:

/page.html?default=<script>alert(document.cookie)</script>, where the document.cookie includes a unique identifier. This payload can be communicated to the web application 112 by sending the client request 130 with the following URL:

http://www.some.site/page.html?default=<script>alert(doc ument.cookie)</script> where "www.some.site" is the web application 112 being analyzed.

The original script code in the web application 112 (e.g., in the web page 114) may not expect the default parameter to contain HTML markup, and as such it may simply echo the HTML into the DOM of the web page at runtime. If the HTML markup were communicated to the web application 112 under other circumstances (e.g., not during the present security analysis) when receiving a response HTML 134 from the web application 112, a client-side application, such as web browser, then may render the resulting page and execute the script:

alert(document.cookie)

Executing such script could result in undesirable information being presented by the client-side application.

This is but one example of a payload 132 that can be communicated to the Web application 112. As noted, the security scanner 122 can communicate multiple payloads 132 to the Web application, thereby effectively testing the Web application for multiple possible vulnerabilities. In one embodiment, one or more lists of payloads 132 can be provided to, and received by, the security scanner, and the security scanner 122 can continue to send the client requests 130 until each of the payloads 132 has been communicated to the Web application 112.

In response to the client request(s) 130, response HTML 134 corresponding to the accessed web page 114 and an associated DOM object 136 can be communicated from the web application 112 to the client 120. If the Web application 112 is vulnerable to the example payload 132 presented above, a document.location object in the DOM object 136 may contain the following string:

http://www.some.site/page.html?default=<script>alert(document.cookie)</script>

The client 120 can be suitably configured to pass the response HTML 134, including the DOM object 136, to the DOM-modeling component 124. The response HTTP 134 need not contain the attacker's payload. Instead, the payload can be manifested at the client 120 at runtime when script associated with the response HTML 134 is executed. Continuing with the example presented above, when a flawed script accesses the DOM a variable document.location, the script itself may assume that it is not malicious. The analysis presented herein, however, can identify such a malicious variable.

The DOM-modeling component 124 can be configured to receive the response HTML 134 and build a DOM abstraction 126 generated to correspond to the DOM object 136. Specifically, the DOM-modeling component 124 can scan the DOM object 136 for instances of the payload 132 content delivered to the Web application 112. The DOM-modeling component 124 can recognize such instances of payload content based on the unique identifiers provided for the payloads, which can be reflected in corresponding sections of the DOM object 136.

If content corresponding to the payload 132 content is found on the DOM object 136, the DOM structure in which the payload 132 content is found can be preserved in the DOM abstraction 126. Further, the payload 132 content can be indicated in the DOM abstraction 126 as being an un-trusted DOM value. For example, the payload content can be highlighted, presented with a particular color or style of font, or comments can be included in the DOM abstraction 126 to identify the payload 132. A reason for indicating the payload content as being un-trusted is that, if the payload remains unidentified, script code (e.g., JavaScript™ code) may traverse this area in the DOM object to retrieve the DOM value in a potentially vulnerable way. Other DOM areas which do not contain un-trusted DOM values (e.g., do not contain payload 132 content) can be safely ignored, and thus need not be included in the DOM abstraction 126. Accordingly, the DOM abstraction 126 can contain only a small portion of the original DOM object 136, thereby keeping the DOM abstraction 126 to a small, easily managed file.

Once the DOM abstraction 126 has been created, the security scanner 122 can perform a static analysis on the HTML, using the DOM abstraction 126 in lieu of the DOM object 136, thereby enabling the HTML to be modeled efficiently. In this regard, the security scanner 122 can include, or otherwise access, a client-side application for rendering HTML, such as a web browser. When the HTML is rendered in the sandbox, script code associated with the HTML that is executed can be monitored to identify whether accesses to the DOM abstraction 126 retrieve one or more un-trusted values. For example, the security scanner 122 can monitor for, and identify, a pop-up dialog containing content of the payload 132. When an un-trusted value is identified, the security scanner 122 can generate a flag indicating that a vulnerability has been identified. The flag can indicate the unique identifier of the corresponding payload 132 having content corresponding to the un-trusted value.

In illustration, continuing the above example, those accesses reading a document.location.href object can be identified. Further, the variable assigned the evaluation of the following expression can be identified as a being tainted:

document.location.href.substring(document.location.href.in dexOf("default=")+8

The result of the following concatenation operation is therefore also is tainted:

"<OPTION value=1>"+document.location.href.substring(document.loca tion.hrefindexOf("default=")+8

Since the concatenation flows into the security-sensitive document.write( ) operation, the security scanner 122 can generate a flag to indicate vulnerability has been detected. It should be noted that this same flow also may have be reported in a case where a complex and rare condition governs the execution of document.write( ) since the static analysis can treat the condition conservatively and follow both execution branches.

At this point also should be noted that keeping the DOM abstraction 126 to a small file size has multiple implications for the static analysis described above. First, from the perspective of performance and scalability, the analysis enjoys a benefit by being able to model and reason about only a small fraction of the original DOM object 136. This can make the analysis orders of magnitude more efficient and scalable in comparison to a case where the DOM object 136 is represented in the DOM abstraction 126 in its entirety. Second, the analysis can be both fully sound and highly precise. The soundness of the analysis is due to the preservation of DOM substructures that lead to potential vulnerabilities, and improved precision is due to the analysis not needing to interpret every value read from the DOM object 136, thereby reducing the risk of DOM substructures being falsely indicated as being potential vulnerabilities.

Figure 2:
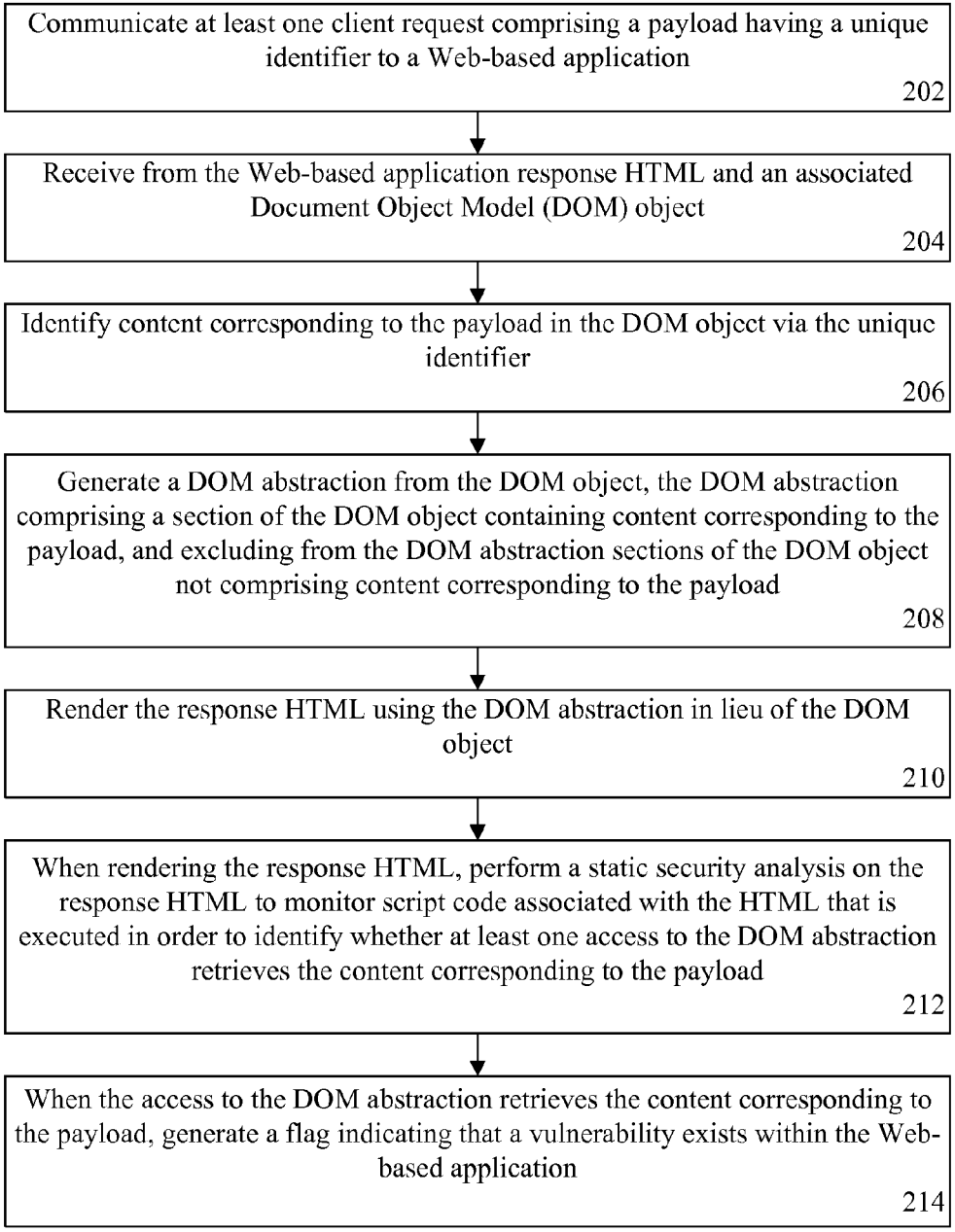
FIG. 2 is a flow chart illustrating a method of detecting DOM-based cross-site scripting vulnerabilities in accordance with one embodiment of the present invention.

FIG. 2 is a flow chart illustrating a method 200 of detecting DOM-based cross-site scripting vulnerabilities in accordance with one embodiment of the present invention. At step 202, at least one client request comprising a payload having a unique identifier can be communicated to a Web-based application. If a vulnerability exist in the Web-based application, content of the payload may be echoed by the Web-based application to a DOM of a web page.

At step 204, a response HTML and an associated Document Object Model (DOM) object can be received from the Web-based application. At step 206, content corresponding to the payload in the DOM object via the unique identifier can be identified. At step 208, a DOM abstraction from the DOM object can be generated. The DOM abstraction can include one or more sections of the DOM object containing content corresponding to the payload(s), and excluding from the DOM abstraction sections of the DOM object not comprising content corresponding to the payload(s).

At step 210, the response HTML can be rendered using the DOM abstraction in lieu of the DOM object. At step 212, when rendering the response HTML, a static security analysis can be performed on the response HTML to monitor script code associated with the HTML that is executed in order to identify whether at least one access to the DOM abstraction retrieves the content corresponding to the payload. At step 214, when the access to the DOM abstraction retrieves the content corresponding to the payload, a flag can be generated to indicate that a vulnerability exists within the Web-based application.

Figure 3:
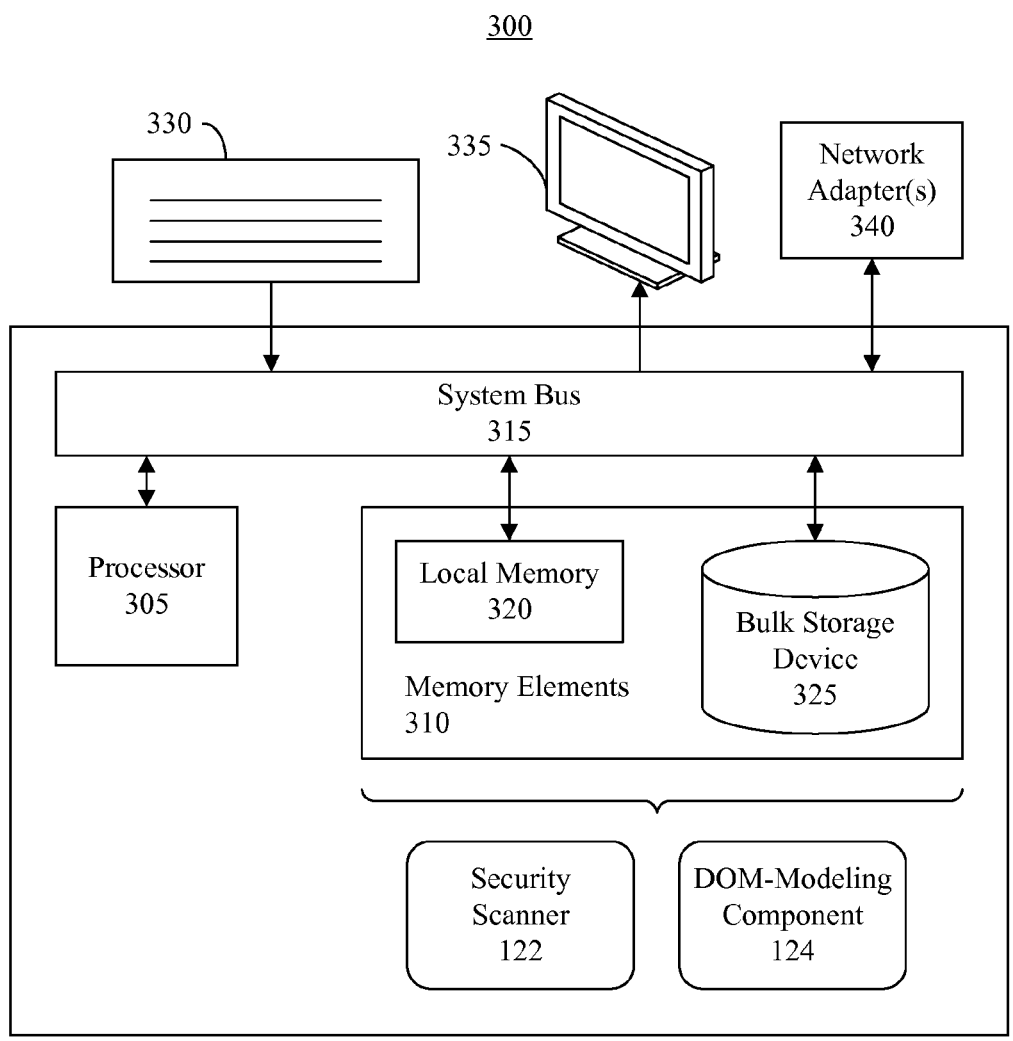
FIG. 3 is a block diagram illustrating a system for detecting DOM-based cross-site scripting vulnerabilities in accordance with one embodiment of the present invention.

FIG. 3 is a block diagram illustrating a system 300 for detecting DOM-based cross-site scripting vulnerabilities in accordance with one embodiment of the present invention. The system can be, for example, the client 120 described with respect to FIG. 1. The system 300 can include at least one processor 305 coupled to memory elements 310 through a system bus 315. As such, the system 300 can store program code within the memory elements 310. The processor 305 can execute the program code accessed from the memory elements 310 via the system bus 315. In one aspect, for example, the system 300 can be implemented as computer that is suitable for storing and/or executing program code. It should be appreciated, however, that the system 300 can be implemented in the form of any system comprising a processor and memory that is capable of performing the functions described within this specification.

The memory elements 310 can include one or more physical memory devices such as, for example, local memory 320 and one or more bulk storage devices 325. Local memory 320 refers to random access memory or other non-persistent memory device(s) generally used during actual execution of the program code. The bulk storage device(s) 325 can be implemented as a hard disk drive (HDD), solid state drive (SSD) or other persistent data storage device. The system 300 also can include one or more cache memories (not shown) that provide temporary storage of at least some program code in order to reduce the number of times program code must be retrieved from bulk storage device 325 during execution.

Input/output (I/O) devices such as a keyboard 330, a display 335, and a pointing device (not shown) optionally can be coupled to the system 300. The I/O devices can be coupled to the system 300 either directly or through intervening I/O controllers. Network adapters 340 also can be coupled to the system 300 to enable the system 300 to become coupled to other systems, computer systems, remote printers, and/or remote storage devices through intervening private or public networks. For example, the network adapter(s) 340 can enable the system 300 to be couples to the server 110 of FIG. 1. Modems, cable modems, and Ethernet cards are examples of different types of network adapters that can be used with the system 300.

As pictured in FIG. 1, the memory elements 110 can store a the security scanner 122 and DOM-modeling component 124 previously described. The security scanner 122 and DOM-modeling component 124, being implemented in the form of executable program code, can be executed by the system 300 (e.g., via the processor 305), to perform the methods, processes and functions described herein.

In one embodiment, the security scanner 122 and DOM-modeling component 124 can be implemented as IBM® Rational® AppScan® (IBM, Rational and AppScan are trademarks of International Business Machines Corporation in the United States, other countries, or both).

Like numbers have been used to refer to the same items throughout this specification. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A system comprising:
   a computer-readable memory having computer-readable program code embodied therewith;
   a processor coupled to the computer-readable memory, wherein responsive to executing the computer-readable program code, the processor is configured to perform executable operations comprising:
   communicating at least one client request comprising a payload having a unique identifier to a Web-based application;
   receiving from the Web-based application response HTML and an associated Document Object Model (DOM) object;
   identifying in the received DOM object the unique identifier communicated to the web-based application in the payload; and
   responsive to identifying in the received DOM object the unique identifier communicated to the web-based application in the payload, identifying as un-trusted a section of the received DOM object comprising content corresponding to the payload, which is identified in the received DOM object via the unique identifier.

2. The system of claim 1, the executable operations further comprising:
   generating a DOM abstraction from the DOM object, the DOM abstraction comprising a section of the DOM object containing the content corresponding to the payload;
   rendering a response HTML using the DOM abstraction in lieu of the DOM object.

3. The system of claim 2, wherein generating the DOM abstraction from the DOM object comprises:
   excluding from the DOM abstraction sections of the DOM object not comprising the content corresponding to the payload.

4. The system of claim 2, said executable steps further comprising:
   when rendering the response HTML, performing a static security analysis on the response HTML to monitor script code associated with the HTML that is executed in order to identify whether at least one access to the DOM abstraction retrieves the content corresponding to the payload; and
   when the access to the DOM abstraction retrieves the content corresponding to the payload, generating a flag indicating that a vulnerability exists within the Web-based application.

5. The system of claim 4, wherein performing the static security analysis on the response HTML to monitor script code associated with the HTML that is executed in order to identify whether at least one access to the DOM abstraction retrieves the content corresponding to the payload comprises:
   identifying a pop-up dialog containing the content corresponding to the payload.

6. The system of claim 1, said executable steps further comprising:
   receiving a list of a plurality of payloads;
   wherein communicating at least one client request comprising the payload having the unique identifier to the Web-based application comprises:
   automatically communicating a plurality of client requests to the Web-based application, where each of the client requests comprises a respective payload selected from the list of the plurality of payloads.

7. The system of claim 1, wherein the payload having the unique identifier comprises content echoed by the Web-based application to a DOM of a web page.

8. A computer program product for testing a Web-based application for security vulnerabilities, the computer program product comprising:
   a computer-readable memory having computer-readable program code embodied therewith, the computer-readable program code comprising:
   computer-readable program code configured to communicate at least one client request comprising a payload having a unique identifier to the Web-based application;
   computer-readable program code configured to receive from the Web-based application response HTML and an associated Document Object Model (DOM) object;
   computer-readable program code configured to identify in the received DOM object the unique identifier communicated to the web-based application in the payload; and
   computer-readable program code configured to, responsive to identifying in the received DOM object the unique identifier communicated to the web-based application in the payload, identify as un-trusted a section of the received DOM object comprising content corresponding to the payload, which is identified in the received DOM object via the unique identifier.

9. The computer program product of claim 8, wherein the computer-readable program code further comprises:
   computer-readable program code configured to generate a DOM abstraction from the DOM object, the DOM abstraction comprising a section of the DOM object containing the content corresponding to the payload;
   computer-readable program code configured to render a response HTML using the DOM abstraction in lieu of the DOM object.

10. The computer program product of claim 9, wherein generating the DOM abstraction from the DOM object comprises:
    excluding from the DOM abstraction sections of the DOM object not comprising the content corresponding to the payload.

11. The computer program product of claim 9, wherein the computer-readable program code further comprises:
    computer-readable program code configured to, when rendering the response HTML, to perform a static security analysis on the response HTML to monitor script code associated with the HTML that is executed in order to identify whether at least one access to the DOM abstraction retrieves the content corresponding to the payload; and
    computer-readable program code configured to, when the access to the DOM abstraction retrieves the content corresponding to the payload, generate a flag indicating that a vulnerability exists within the Web-based application.

12. The computer program product of claim 11, wherein performing the static security analysis on the response HTML to monitor script code associated with the HTML that is executed in order to identify whether at least one access to the DOM abstraction retrieves the content corresponding to the payload comprises:
    identifying a pop-up dialog containing the content corresponding to the payload.

13. The computer program product of claim 8, wherein the computer-readable program code further comprises:
    computer-readable program code configured to receive a list of a plurality of payloads;

wherein communicating at least one client request comprising the payload having the unique identifier to the Web-based application comprises:
automatically communicating a plurality of client requests to the Web-based application, where each of the client requests comprises a respective payload selected from the list of the plurality of payloads.

14. The computer program product of claim 8, wherein the payload having the unique identifier comprises content echoed by the Web-based application to a DOM of a web page.

15. The system of claim 1, wherein the payload is script code provided to the Web-based application in the client request.

16. The computer program product of claim 8, wherein the payload is script code provided to the Web-based application in the client request.

17. A system comprising: a computer-readable memory having computer-readable program code embodied therewith;
a processor coupled to the computer-readable memory, wherein responsive to executing the computer-readable program code, the processor is configured to perform executable operations comprising:
communicating at least one client request comprising a script code having a unique identifier to a Web-based application;
receiving from the Web-based application response HTML and an associated Document Object Model (DOM) object, the received DOM object including the unique identifier communicated to the Web-based application in the script code;
identifying in the received DOM object the unique identifier communicated to the Web-based application in the script code; and
responsive to identifying in the received DOM object the unique identifier communicated to the web-based application in the script code, identifying as un-trusted a section of the received DOM object comprising content corresponding to the script code, which is identified in the received DOM object via the unique identifier.

* * * * *